US008839221B2

(12) United States Patent
Sapuntzakis et al.

(10) Patent No.: US 8,839,221 B2
(45) Date of Patent: Sep. 16, 2014

(54) AUTOMATIC ACQUISITION AND INSTALLATION OF SOFTWARE UPGRADES FOR COLLECTIONS OF VIRTUAL MACHINES

(75) Inventors: Constantine P. Sapuntzakis, Mountain View, CA (US); Martin Rinard, Arlington, MA (US); Gautam Kachroo, San Francisco, CA (US)

(73) Assignee: Moka5, Inc., Redwood City, CA (US)

( * ) Notice: Subject to any disclaimer, the term of this patent is extended or adjusted under 35 U.S.C. 154(b) by 1006 days.

(21) Appl. No.: 12/208,314

(22) Filed: Sep. 10, 2008

(65) Prior Publication Data

US 2009/0100420 A1 Apr. 16, 2009

Related U.S. Application Data

(60) Provisional application No. 60/971,208, filed on Sep. 10, 2007.

(51) Int. Cl.
*G06F 9/45* (2006.01)

(52) U.S. Cl.
USPC ................ 717/168; 717/170; 717/174; 718/1

(58) Field of Classification Search
USPC ........................................................ 717/168
See application file for complete search history.

(56) References Cited

U.S. PATENT DOCUMENTS

| 6,698,017 | B1* | 2/2004 | Adamovits et al. ........... 717/168 |
| 7,230,562 | B1* | 6/2007 | Provis et al. .................. 341/176 |
| 7,356,679 | B1* | 4/2008 | Le et al. .............................. 713/1 |
| 7,577,722 | B1* | 8/2009 | Khandekar et al. ........... 709/220 |
| 7,653,828 | B2* | 1/2010 | Kostadinov et al. .......... 713/400 |
| 7,814,495 | B1* | 10/2010 | Lim et al. ....................... 718/104 |
| 7,849,462 | B2* | 12/2010 | Traut et al. ........................ 718/1 |
| 8,219,987 | B1* | 7/2012 | Vlaovic et al. .................... 718/1 |
| 8,266,576 | B2* | 9/2012 | Lam et al. ...................... 717/100 |
| 8,407,696 | B2* | 3/2013 | Alpern et al. ...................... 718/1 |
| 8,473,938 | B1* | 6/2013 | Feeser ........................... 717/168 |
| 2002/0188935 | A1* | 12/2002 | Hertling et al. ............... 717/170 |
| 2003/0217131 | A1* | 11/2003 | Hodge et al. .................. 709/223 |
| 2004/0003266 | A1* | 1/2004 | Moshir et al. ................. 713/191 |
| 2006/0047974 | A1* | 3/2006 | Alpern et al. ................. 713/191 |
| 2006/0155674 | A1* | 7/2006 | Traut et al. ........................ 707/2 |
| 2006/0155735 | A1* | 7/2006 | Traut et al. .................... 707/101 |
| 2006/0168574 | A1* | 7/2006 | Giannini et al. .............. 717/168 |
| 2006/0277542 | A1* | 12/2006 | Wipfel .......................... 717/174 |
| 2007/0043860 | A1* | 2/2007 | Pabari ........................... 709/224 |
| 2007/0089111 | A1* | 4/2007 | Robinson et al. .................. 718/1 |

(Continued)

OTHER PUBLICATIONS

A. Orso, A. Rao, M. Harrold, "A Technique for Dynamic Updating of Java Software," icsm, pp. 0649, 18th IEEE International Conference on Software Maintenance (ICSM'02), 2002.*

*Primary Examiner* — Wei Zhen
*Assistant Examiner* — Matthew Brophy
(74) *Attorney, Agent, or Firm* — Park, Vaughan, Fleming & Dowler LLP

(57) ABSTRACT

An automated approach to updating, testing, and distributing virtual machine images is described. Centralized updates allow for a virtual machine image executed locally on thousands of machines to be updated in a single place and the automated testing and distribution signaling provides for smooth rollouts of the updates.

18 Claims, 2 Drawing Sheets

(56) References Cited

U.S. PATENT DOCUMENTS

| | | | |
|---|---|---|---|
| 2007/0294676 A1* | 12/2007 | Mellor et al. | 717/139 |
| 2008/0034364 A1* | 2/2008 | Lam et al. | 718/1 |
| 2008/0098368 A1* | 4/2008 | Biswas et al. | 717/136 |
| 2008/0126792 A1* | 5/2008 | Herington et al. | 713/100 |
| 2008/0209409 A1* | 8/2008 | Van Riel et al. | 717/168 |
| 2008/0271017 A1* | 10/2008 | Herington | 718/1 |
| 2008/0307414 A1* | 12/2008 | Alpern et al. | 718/1 |
| 2010/0011200 A1* | 1/2010 | Rosenan | 713/2 |

* cited by examiner

AUTOMATIC ACQUISITION AND INSTALLATION OF SOFTWARE UPGRADES FOR COLLECTIONS OF VIRTUAL MACHINES

CLAIM OF PRIORITY

This application claims the benefit of priority to U.S. provisional patent application Ser. No. 60/971,208, filed Sep. 10, 2007, hereby incorporated by reference.

TECHNICAL FIELD

The technology described herein generally relates to software, and more particularly relates to maintenance of virtual machines.

BACKGROUND

Virtual machines decouple computing environments from hardware, making it possible to run a single computing environment on many different hardware platforms or to run multiple computing environments on a single hardware platform. It is possible to carry a computing environment between platforms as a user travels, or to have a single hardware platform run multiple different computing environments, or a combination of the two. Moreover, virtual machines make it possible to build a single composite computing environment up out of multiple virtual machines, with the various machines largely isolated from each other except to share application files. This isolation can be especially useful as it can protect one part of the computing environment from errors or vulnerabilities in other parts of the environment. It also supports much easier upgrading and maintenance of computing environments. For example, a user can have a web browsing virtual machine. If the browser becomes infected with a virus, the effects are confined to the virtual machine. If the browser becomes improperly configured because the user visits web sites that change the configuration settings, the user can simply discard the virtual machine and restore the original virtual machine. The rest of the composite computing environment remains intact. The widespread use of virtual machines can therefore bring significant improvements to a user's computing environment.

The advantages of virtual machines has led to the development of virtual machine web sites and marketplaces that store a wide range of differently configured virtual machines suitable for different user needs. These virtual machines comprise files stored on web sites that users or customers access to acquire the virtual machines they want or need. The presence of so many virtual machines, which remain inactive until they are acquired by users or customers, creates an information technology management problem. Computing environments such as virtual machines typically require maintenance in the form of software upgrades to correct coding errors, add new functionality, eliminate security vulnerabilities, etc. One standard way to perform an update establishes an automatic update process in which software in the running environment periodically checks an update source such as a web site for the presence of any new software updates. If the update process finds such updates, it downloads them and installs them into the environment. Another standard update process requires that a user access a website directly to find and install any new updates. None of these update processes are suitable for keeping the many and manifold virtual machines in a virtual machine repository or website correctly updated with software updates. The virtual machines in a repository or marketplace do not boot until they are downloaded and booted by the user and therefore do not receive and install any software upgrades while they are in the repository.

It would be preferable to automate the acquisition and installation of software upgrades for collections of virtual machines. In addition, the upgraded virtual machines need to be validated to ensure that they function correctly after the software upgrades are installed.

DETAILED DESCRIPTION

Overview

An automated approach to updating, testing, and distributing virtual machine images is described. Within an environment where thousands laptops, desktops, and USB drives all over the world have access to a single virtual machine image, all of the authorized users can use a virtual machine player to launch a secure desktop environment making use of the virtual machine image. Using existing technologies, the virtual machine image may be restored back to the master version on each boot of the virtual machine. This helps protect users of the virtual machine image from viruses, spyware, etc., that might be acquired. However, IT administrators still face problems and challenges managing updates to the virtual machine image itself.

The present application is directed to various embodiments of a method for managing updates to a virtual machine and more particularly to centralizing the installation of updates, automating the testing of the updated image, and assisting in the distribution of the updated centralized image.

Centralized Installation: This means that the virtual machine only needs to be updated in one place. So for example, the update process according to embodiments of the present application could be run after every patch or on every Tuesday to update the master image. Note, however, that if the virtual machine image is processed on multiple machines to perform the update process (e.g., one machine kicks off the update process, update is performed on another machine, and tested on another machine, etc.) it is still considered a centralized installation process.

Automated testing: If an update "breaks" something (e.g., an application can no longer be launched), then rolling out the update to thousands of users will cause tremendous problems. Automatic testing of the updated virtual machine, using tests established by, for example, the user, service provider, or update provider can mitigate the likelihood of failure.

The assistance in distribution can take a number of forms, e.g., updating an RSS, or atom, feed to indicate the availability of an updated virtual machine image, sending a signal to each currently "online" client (e.g., user using the virtual machine player) that an updated image is available, placing the updated image in a predetermined location (e.g., a website, FTP site).

Process

Figure 1:
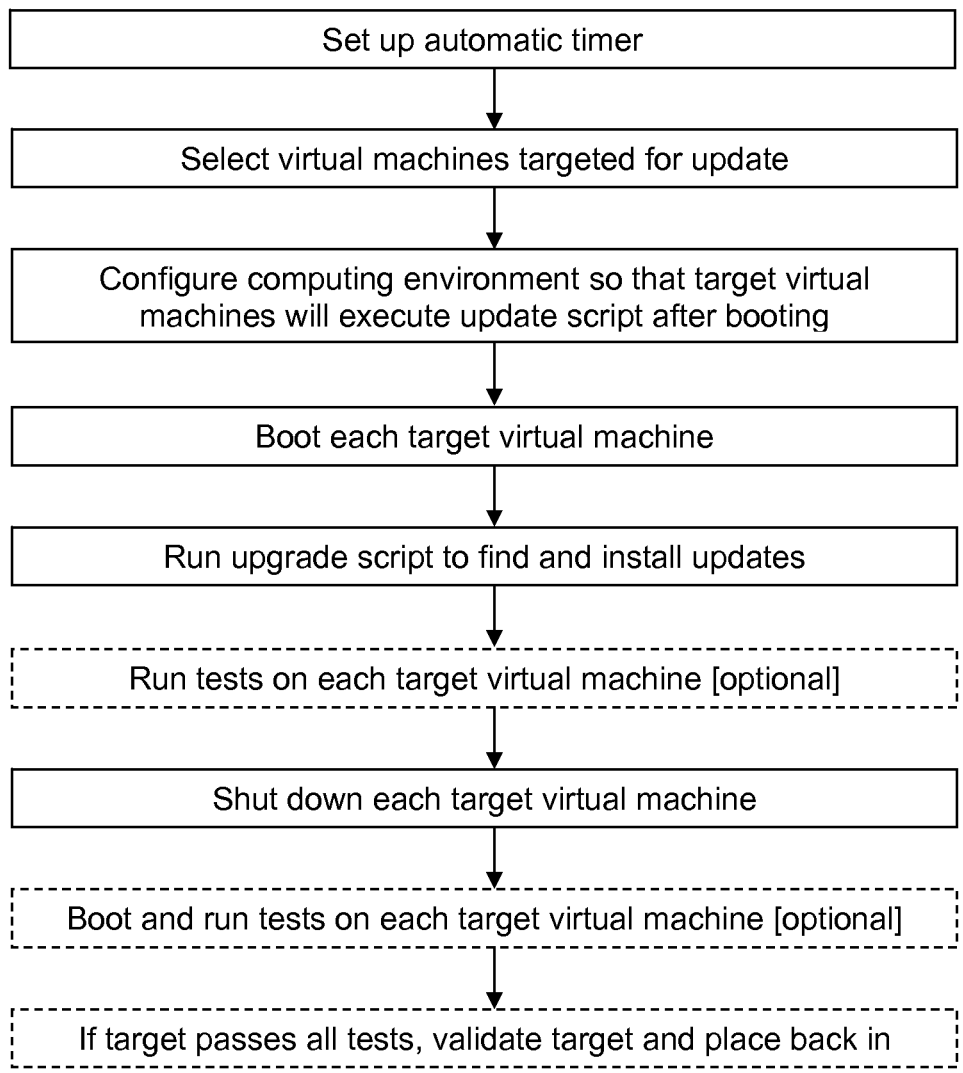
FIG. 1 is a flowchart illustrating a process for automated updating and testing of virtual machines according to one embodiment.

FIG. 1 illustrates one embodiment of a process providing centralized installation, automated testing, and assistance in the distribution of a virtual machine comprises the following steps. First, an automatic timer mechanism is set up that periodically triggers the execution of the automatic upgrade process. Second, a virtual machine is selected as an upgrade target. Third, the computing environment is configured so that the target virtual machine will appropriately execute an upgrade script when or shortly after it boots. Fourth, the target virtual machine is booted. Fifth, the upgrade script then runs to find and install any necessary software upgrades. When the upgrades have been installed, the script shuts down the upgraded virtual machine. Sixth, and optionally, a set of tests are run on the virtual machine, potentially booting the virtual machine once again to perform the tests. In some embodiments, the tests are performed immediately after the upgrades and before shutting down the virtual machine. Finally, if the virtual machine passes all of the tests, it is validated, placed back in the repository or marketplace, and notifications regarding the updated virtual machine are generated.

System

Figure 2:
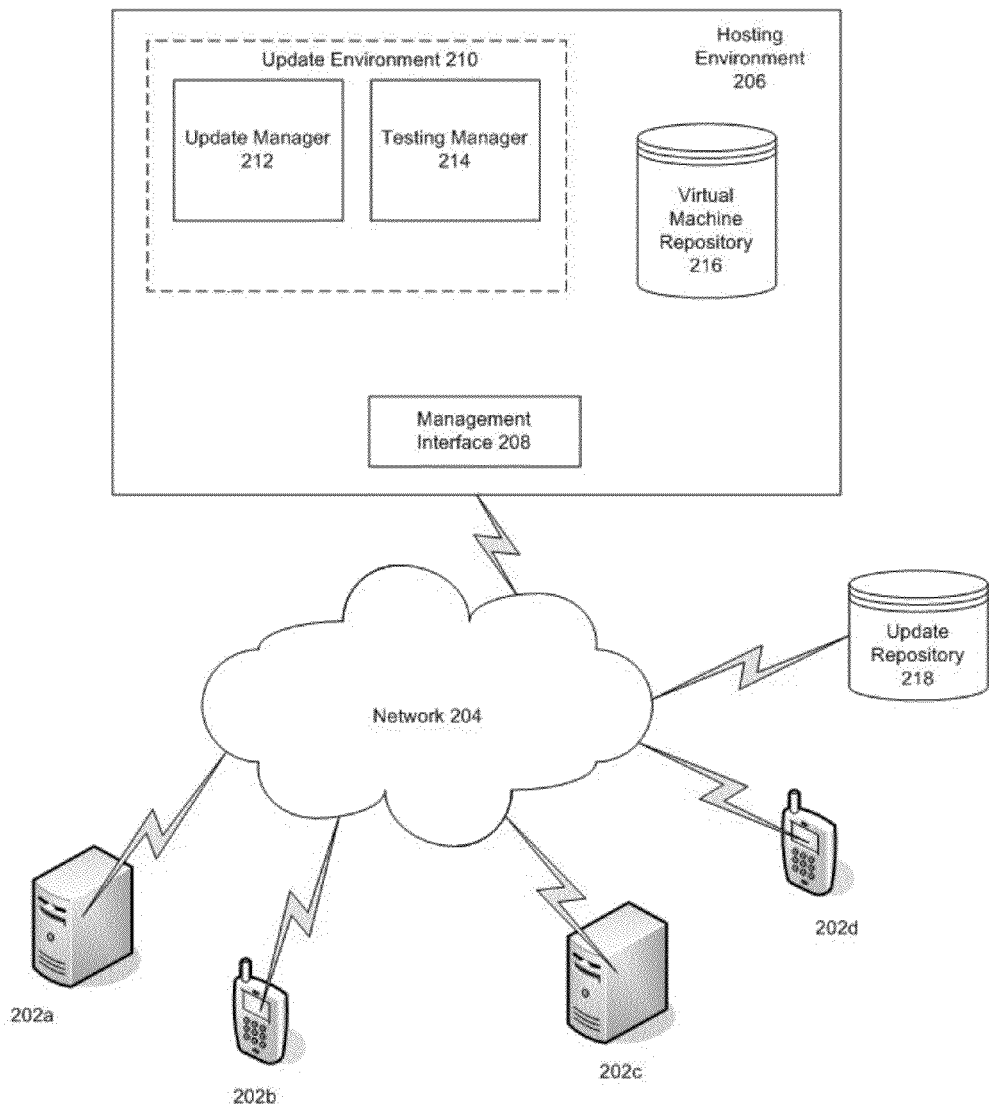
FIG. 2 is a schematic of a system for executing the methods described herein.

FIG. 2 illustrates one embodiment of a system 200 for executing the steps in the methods described herein, including the process of FIG. 1. The elements of FIG. 2 and their interconnections will now be described followed by their use. FIG. 2 includes a network 204 which couples systems and devices 202a-d in communication with a hosting environment 206 for virtual machines. The hosting environment 206 includes a virtual machine repository 216, a management interface 208, and an update environment 210. The update environment 210 includes an update manager 212 and a testing manager 214. The network 204 can be any network such as an internal network or the internet. Although the hosting environment 206 is shown as a single block, it may be composed of a variety of physical and/or virtual computer resources with CPUs, computer readable storage medium directly, or network, attached in one or more locations throughout the world. The components of the hosting environment 206 are coupled in communication with one another. The update repository 218 may be in multiple locations, including in some embodiments within the hosting environment 206 (e.g. internal update repository). The virtual machine repository 216 includes the virtual machines used by the computers and devices 202a-d and stores the original, and later, the updated virtual machines. Whether or nor prior versions of the virtual machines are maintained in the repository virtual machine repository 216 is a management policy controllable through the management interface which also controls which devices and/or users have access to the virtual machines in the repository 216. The update environment may include one or more computing resources and computer readable storage media (not shown) for performing the updates and testing according to embodiments described herein.

Triggering the Update Process

In one embodiment, an automatic timer, which may be located on hosting environment 206, is used to schedule updates. Operating systems such as Linux and the Microsoft Windows family of operating systems contain well-known mechanisms for periodically invoking and executing selected software programs. The Linux "at" command, for example, enables certain commands to be scheduled to execute at a later time (also other tools such as "cron" can be used). It is possible to use this command to set up a script or other piece of software that will periodically run and execute the remainder of the upgrade process described herein.

Updates for some software products are released at predictable times. One embodiment triggers the update process for virtual machine images containing such software products shortly after these updates are released at update repository 218, either by defining an appropriate schedule and/or through invoking a script at a relatively higher frequency (e.g., hourly, daily) that in turn performs further analysis to determine whether updates or available. Note that in some embodiments there are multiple update repositories, e.g. an internal update repository within the hosting environment 206 and an external repository. For example, such a script could check update repository 218, for example, a Windows Update server, on an hourly basis for software updates, and then proceed to install any discovered updates.

In other embodiments, notifications regarding the availability of updates at update repository 218 are received through a variety of mechanisms, e.g., RSS/Atom feeds, email notifications, and a web service or other API that can be polled for updates.

Selecting Virtual Machines

An update schedule determines when different virtual machines are updated. As described above, virtual machines containing software with a regular update release schedule are, in one embodiment, updated shortly after the updates are released. Other virtual machines are updated regularly as processing time and capacity permit. Once a virtual machine has been selected for updating, one embodiment copies the virtual machine to update environment 210, leaving the original virtual machine in the virtual machine repository 216, thereby ensuring that the original virtual machine will not be inadvertently changed and remains available for user access.

Configuring the Environment to Execute the Upgrade Script

Virtual machines are booted within computing resources in update environment 210. In one embodiment, update manager 212 configures virtual machine and/or the contents of the virtual machine to ensure that, either during the boot or shortly after the boot of the virtual machine, the virtual machine executes an appropriate update script. There are a variety of appropriate mechanisms.

One appropriate mechanism is to configure the virtual machine, when it is originally built or sometime before it is automatically updated, so that it looks in a specific location within a file system to find and execute the update script. Existing operating systems support a variety of well-known mechanisms that it is possible to use to accomplish this goal.

In the Microsoft Windows operating system, for example, it is possible to use the gina.dll mechanism. The gina.dll DLL is loaded whenever the operating system boots. It is possible to use the well-known Microsoft Windows registry mechanism to change the specific version of the gina.dll that is loaded. Instead of loading the standard gina.dll, the registry can be configured to load a special version of the gina.dll. When the gina.dll is loaded, the API call Wlxinitialize is invoked. The Wlxinitialize API call in the special version of the gina.dll is set up to find and execute the appropriate update script. This script can be placed in a specific location in the virtual machine's file system using a loopback virtual disk mount before the virtual machine boots (this loopback mount allows update environment 210 to write files into the file system of the virtual machine without the need to boot the virtual machine). Or the update script can be placed on a specific server that the code in the gina.dll accesses to acquire the update script. Or the script can be placed in a particular location in a file system coupled in communication with update environment 210 that the code in the gina.dll accesses (via, for example, the VMWare HGFS file system, via a Samba mount, or some other mechanism) to find the update script.

It is also possible to place, for example, the code that accesses the script in a Windows Startup folder for a specific user. By appropriately configuring the Windows registry using known techniques, it is possible to cause that user to be automatically logged in when virtual machine boots. Placing the update script in the Windows Startup folder causes it to execute when the user is automatically logged in.

Acquiring and Performing Updates

The Microsoft corporation provides a public API for accessing their auto-update functionality. Update scripts for Microsoft software use this API to find, acquire, and install any new updates. Other software vendors and providers place software upgrades on web sites. If the virtual machine contains software from such vendors, the update script will automatically access the appropriate web sites (i.e., update repository 218) to find and install the appropriate updates. In some cases the update script will have access to specific patch files to be applied. The update script will access these patch files from known locations using techniques described above. It will then apply the patch to perform the update. Similar approaches are usable for other operating systems; for example, Debian Linux distributions support the "apt-get" command to easily update the system.

Shutting Down the Virtual Machine

Once the updates have been performed, the script executes a command (such as the Windows shutdown command) to cause the virtual machine to shut down.

Testing and Validation

One embodiment uses a set of tests to validate the newly updated virtual machine using testing manager 214 and one or more computing resources and computer readable storage (not shown). The testing manager 214 tests boot the virtual machine and automatically exercises functionality such as running applications on chosen inputs, accessing remote web pages, etc. If the virtual machine passes these tests, it is validated. The updated virtual machine is then placed back in the repository or marketplace for others to access. The tests may come from multiple sources, e.g., user-written, service provider-written (e.g., MokaFive for the MokaFive service, provided by moka5, Inc. of Redwood City, Calif.), update vendor written (e.g., Microsoft-supplied for a Microsoft update), and/or other sources.

Also, referring to FIG. 1, the testing is shown as optional and shown as occurring either, before, after, or both before and after the shutdown of the virtual machine described in the section above. The timing of the tests may depend on whether or not a machine reboot is required to complete the update and/or whether and what kinds of tests are required.

Assisted Distribution

If the desired testing completes successfully, distribution of the updated virtual machine is the next step. As shown in the embodiment of FIG. 1, the updated virtual machine is placed back into virtual machine repository 216. In environments such as the MokaFive Service, this event might be sufficient to cause users of the virtual machine to automatically download the updated virtual machine from the repository.

In other embodiments, assisting in the distribution can take the form of steps such as updating an RSS/Atom, or similar, feed and/or website to indicate the availability of an updated virtual machine. Colloquially, this would be considered to be a "pull" solution since it requires the client to poll the feed and then pull the update.

In another embodiment, assisting in the distribution can take the form of sending a signal to each currently "online" client signifying that an update virtual machine is available. Colloquially, this would be considered to be a "push" solution since the client is told about and pushed the updated image from the server.

Policies

Management interface 208 (web or otherwise) can enable the definition of a policy for controlling client updates. For example, in one embodiment, a policy could limit virtual machines more than N-releases old from being accessed. In another embodiment, responsive to a signal indicating that the image for the virtual machine has been updated and is available for use, a policy can define whether an update is rolled out immediately (e.g., forcibly stop work on client virtual machines), or upon the next reboot, or more gradually over passage of a predetermined time interval (e.g., user has N-hours or N-reboots left until the outdated image expires.) To accommodate highly mobile users with potentially low bandwidth connections, different embodiments may allow for policies that allow greater latitude in not making use of the updated virtual machine depending on a variety of factors such as connection speed.

Additional Embodiments and Update Techniques

The follow sections describe additional embodiments and more specific update techniques that can be used in a variety of configurations of the processes described above.

Offline Updates

In some usage scenarios there are many virtual machines that share certain aspects of their configuration. For example, there may be many virtual machines with Microsoft Windows XP. The different virtual machines would differ in the software installed on top of Windows XP. Because of the shared configuration aspects, these machines would perform similar if not identical configuration steps when updating the shared parts of the configuration. An alternate embodiment optimizes the process of updating shared parts of the configuration by updating one of the configurations, recording either the configuration steps or the results of the configuration, then using the recorded information to update the remaining virtual machines that share the same parts of their configuration in an offline manner.

Recording Update Steps

In an alternate embodiment, the configuration steps performed during an update are recorded by interposing an instrumentation layer that records the steps that take place during the update. The Windows IAT (import address table) provides an effective mechanism that can be used to implement this interposition. Many Windows programs use dynamically linked libraries (DLLs) whose application program interfaces (APIs) provide a mechanism that application programs can use to access state such as the file system. It is possible, using well-known techniques, to hook the IAT entries to divert the DLL entry calls to appropriately constructed pieces of instrumentation code that record the relevant steps. Depending on the semantics of the particular hooked DLL calls, it is possible to record different kinds of information. For example, it is possible to record information summarizing file reads, writes, changes, creations, and removals. For another example, it is possible to record finer granularity information about Windows registry updates. For yet another example, it is possible to record information about messages sent over the network to a server. Two particularly useful DLLs to hook are the Windows kernel32 DLL and the Windows nt.dll DLL, both of which export calls that operate on the file system and/or the Windows Registry.

Some embodiments may use other interposition mechanisms. It is possible, for example, to insert new drivers into the operating system kernel. These new drivers would then record information about the steps that the update performs. It is also possible to interpose an instrumentation layer at the level of individual disk block writes, or to use existing mechanisms such as remote file system mounting systems such as Samba or the VMWare Host-Guest File System mechanism. It is also possible to interpose instrumentation layers into network stacks to record information about relevant network operations. It is also possible to intercept computer bus transactions and other low-level hardware actions to record information such as writes to configuration registers in attached devices.

Recording Configuration Results

In an alternate embodiment, the state of the virtual machine is recorded before and after the update. The information summarizing the differences is then stored; in particular, enough information is stored to be able to recreate the after state of the machine starting with the original state before the update.

Hybrid Approaches

It is also possible to combine the recording and differencing approach disclosed above. For example, one might use the recording scheme to identify a list of files that have been created, changed, or removed, then use the differencing approach to determine the contents of the new files or the contents of the changed files before and after the update.

Performing the Offline Update

To perform an offline update, the state of the virtual machine is accessed as the virtual machine is stored in the environment performing the update. One way to facilitate this access is to use well-known techniques (e.g., loopback virtual disk mount) that make it possible to mount the file system (and potentially other state) of the virtual machine within the environment running the offline update. It is also possible to access the virtual machine directly as it is stored in the environment without booting the virtual machine.

If the offline update process is given a set of recorded update steps, it replays the steps on the virtual machine state. A typical update step will create or change a file or the Windows registry; carrying out the same creation or change will provide the same effect. If the offline update process is given information summarizing differences, it uses the difference information to change the identified parts of the state to achieve the updated state. A typical step is to create or change a file, but other steps are possible and supported.

An alternate embodiment uses a script to update each virtual machine in an offline manner. The script is configured to perform the necessary state changes to enable the update. In some embodiments the script may be developed by a developer or some other person.

Embedded Installation Scripts

An alternate embodiment uses an embedded installation script. This script is placed inside the virtual machine and runs every time the virtual machine is booted. The script functions in one of two ways. It is either injected into the virtual machine using known techniques, with the injected script configured to perform the appropriate update steps. Or the script reads a piece of the state (such as a VMWare guest variable) that indicates a location to search for further update steps to perform. Examples of such locations include network addresses and endpoint or other pieces of state. The piece of state can also contain the update steps directly. The two mechanisms may be combined, e.g., an injected script reads an external source or sources for additional update information.

Patch Lists

In some embodiments the update mechanism installs patches. The update mechanism is given a totally or partially ordered set of patches to apply and applies the patches in a total or partial order consistent with the provided order. Some patches and, in general, some update steps may require the virtual machine to shut down and reboot before subsequent patches or update steps may be performed. The patch mechanism performs all of these steps appropriately. A grouping mechanism groups the patches prior to installation and installs the patches in those groups, potentially requiring a shut down and restart after each group. The groups may have an associated partial or total order in which they are to be performed; the groups are installed in this order. The patches or update steps may come with configuration information detailing how to perform the corresponding update steps without requiring human intervention.

Update Failures

It is possible for some update steps to fail. Some embodiments support a failure detection mechanism that examines the results of the update step to determine if the update step succeeded or failed. Some embodiments further support a failure toleration mechanism that accepts a specification of update dependences between update steps. If one update step is dependent on another update step that fails, the first update step is not performed. Update steps that are not dependent on any failed update steps are performed.

Technical Embodiments

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard, a pointing device, e.g., a mouse or a trackball, or a musical instrument including musical instrument data interface (MIDI) capabilities, e.g., a musical keyboard, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, the invention can be embodied in a purpose built device.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a process and system for automated updating and testing of virtual machines has been described.

What is claimed is:

1. A method for managing software updates to a virtual machine, the virtual machine for use on a plurality of systems and devices making use of the virtual machine, the method comprising:

retrieving the virtual machine from a centralized repository available to the plurality of systems and devices, wherein the virtual machine provides a computing platform on which an application is executed;

executing the virtual machine in a virtual machine monitor on a computer system;

executing a script within the virtual machine, wherein the script applies one or more updates to the virtual machine while the virtual machine is executing to create an updated virtual machine, wherein the updated virtual machine includes an updated version of the computing platform on which the application is executed;

recording steps involved in the one or more updates to the virtual machine, wherein the recorded steps are used for offline updating of at least a portion of another virtual machine;

performing one or more automated tests of the updated virtual machine using the virtual machine monitor on the computer system, wherein the one or more automated tests validates functionality of the updated virtual machine; and in response to determining that the updated virtual machine successfully passed the one or more automated tests, replacing the virtual machine with the updated virtual machine in the centralized repository, and generating a signal indicating that the virtual machine has been updated.

2. The method of claim 1, wherein each system or device in the plurality of systems and devices maintains a copy of the virtual machine locally, and wherein the signal includes an address selected from the set consisting of a uniform resource locator (URL) and a uniform resource identifier (URI), wherein the address describes a location where the updated virtual machine can be downloaded.

3. The method of claim 1, wherein the one or more automated tests are selected from the set consisting of:
 a test to determine that the updated virtual machine reboots successfully;
 a test to determine that the updated virtual machine allows a test user to login successfully;
 a test to determine that the application launches successfully using the updated virtual machine;
 a test to determine that the updated virtual machine has network access; and
 a test to determine that the updated virtual machine configuration complies with a predetermined security profile.

4. The method of claim 1, further comprising retrieving, executing, applying, performing and determining on a recurring basis to regularly update the virtual machine.

5. The method of claim 4, wherein the recurring basis comprises a predetermined time interval between updates.

6. The method of claim 4, wherein the recurring basis is comprises responding to receipt of a indication that an update is available.

7. The method of claim 1, wherein the virtual machine is associated with an update policy, the update policy specifying how the plurality of systems and devices using the virtual machine respond to the signal.

8. The method of claim 7, wherein the update policy specifies that the updated virtual machine must be used immediately.

9. The method of claim 7, wherein the update policy specifies that the virtual machine may be used until the next reboot before using the updated virtual machine.

10. A computer program product, stored on a non-transitory computer readable medium, the product comprising instructions operable to cause a computer system to perform a method for managing software updates to a virtual machine, the virtual machine for use on a plurality of systems and devices making use of the virtual machine, the method comprising:
 retrieving the virtual machine from a centralized repository available to the plurality of systems and devices, wherein the virtual machine provides a computing platform on which an application is executed;
 executing the virtual machine in a virtual machine monitor on a computer system;
 executing a script within the virtual machine, wherein the script applies one or more updates to the virtual machine while the virtual machine is executing to create an updated virtual machine, wherein the updated virtual machine includes an updated version of the computing platform on which the application is executed;
 recording steps involved in the one or more updates to the virtual machine, wherein the recorded steps are used for offline updating of at least a portion of another virtual machine;
 performing one or more automated tests of the updated virtual machine using the virtual machine monitor on the computer system, wherein the one or more automated tests validates functionality of the updated virtual machine; and
 in response to determining that the updated virtual machine successfully passed the one or more automated tests,
 replacing the virtual machine with the updated virtual machine in the centralized repository, and
 generating a signal indicating that the virtual machine has been updated.

11. The computer program product of claim 10, wherein each system or device in the plurality of systems and devices maintains a copy of the virtual machine locally, and wherein the signal includes an address selected from the set consisting of a uniform resource locator (URL) and a uniform resource identifier (URI), wherein the address describes a location where the updated virtual machine can be downloaded.

12. The computer program product of claim 10, wherein the one or more automated tests are selected from the set consisting of:
 a test to determine that the updated virtual machine reboots successfully;
 a test to determine that the updated virtual machine allows a test user to login successfully;
 a test to determine that the application launches successfully using the updated virtual machine;
 a test to determine that the updated virtual machine has network access; and
 a test to determine that the updated virtual machine configuration complies with a predetermined security profile.

13. The computer program product of claim 10, further comprising retrieving, executing, applying, performing and determining on a recurring basis to regularly update the virtual machine.

14. The computer program product of claim 13, wherein the recurring basis comprises a predetermined time interval between updates.

15. The computer program product of claim 13, wherein the recurring basis is comprises responding to receipt of a indication that an update is available.

16. The computer program product of claim 10, wherein the virtual machine is associated with an update policy, the update policy specifying how the plurality of systems and devices using the virtual machine respond to the signal.

17. The computer program product of claim 16, wherein the update policy specifies that the updated virtual machine must be used immediately.

18. The computer program product of claim 16, wherein the update policy specifies that the virtual machine may be used until the next reboot before using the updated virtual machine.

* * * * *